(12) United States Patent
Singh et al.

(10) Patent No.: US 11,266,072 B2
(45) Date of Patent: Mar. 8, 2022

(54) SEPARATOR MODULE FOR AN AGRICULTURAL MACHINE

(71) Applicant: Deere & Company, Moline, IL (US)

(72) Inventors: Manish Singh, Pune (IN); Bradley P. Bogue, Le Claire, IA (US); Kerry M. Cone, Bellevue, IA (US)

(73) Assignee: DEERE & COMPANY, Moline, IL (US)

( * ) Notice: Subject to any disclaimer, the term of this patent is extended or adjusted under 35 U.S.C. 154(b) by 374 days.

(21) Appl. No.: 16/409,545

(22) Filed: May 10, 2019

(65) Prior Publication Data
US 2020/0352105 A1 Nov. 12, 2020

(51) Int. Cl.
| | |
|---|---|
| *A01F 12/30* | (2006.01) |
| *G10K 11/16* | (2006.01) |
| *A01F 7/06* | (2006.01) |
| *A01F 12/44* | (2006.01) |
| *A01F 12/58* | (2006.01) |

(52) U.S. Cl.
CPC ............ *A01F 12/30* (2013.01); *A01F 7/067* (2013.01); *A01F 12/44* (2013.01); *A01F 12/58* (2013.01); *G10K 11/16* (2013.01)

(58) Field of Classification Search
CPC .......... A01F 12/30; A01F 7/067; A01F 12/44; A01F 12/58; A01F 12/10; A01F 7/02; A01F 12/18; A01F 12/00; G10K 11/16; G10K 11/162; A01D 41/12
See application file for complete search history.

(56) References Cited

U.S. PATENT DOCUMENTS

| | | | | |
|---|---|---|---|---|
| 3,994,845 | A | | 11/1976 | Blachford |
| 4,100,720 | A | | 7/1978 | Carnewal et al. |
| 4,108,150 | A | * | 8/1978 | Shaver ............... A01F 12/18 460/104 |
| 4,180,081 | A | * | 12/1979 | Shaver ............... A01F 12/442 460/16 |
| 4,192,322 | A | * | 3/1980 | Wilson ............... A01F 7/06 460/70 |
| 4,291,709 | A | * | 9/1981 | Weber ............... A01F 7/06 460/70 |
| 4,706,690 | A | * | 11/1987 | Huhman ............. A01F 12/10 460/120 |

(Continued)

FOREIGN PATENT DOCUMENTS

| | | |
|---|---|---|
| CN | 2351925 Y | 12/1999 |
| CN | 201758567 U | 3/2011 |

(Continued)

OTHER PUBLICATIONS

John Deere, "Beater Cover Part No. ST837669 for S790 Combine," <https://partscatalog.deere.com/jdrc/sidebyside/equipment/1650013/referrer/navigation/pgld/224918224>, web page publicly available at least as early as May 9, 2019.

*Primary Examiner* — Arpad Fabian-Kovacs
(74) *Attorney, Agent, or Firm* — Michael Best & Friedrich LLP

(57) ABSTRACT

A separator module for an agricultural machine. The separator module includes a feederhouse configured to receive crop from a harvesting platform, a casing enclosing a rotor positioned therein and rotatable relative to the casing for processing crop from the feederhouse, a cover extending between the feederhouse and the casing, and a noise control treatment coupled to the cover.

20 Claims, 8 Drawing Sheets

(56) References Cited

U.S. PATENT DOCUMENTS

| | | | | |
|---|---|---|---|---|
| 4,739,773 | A | * | 4/1988 | West ............... A01F 12/442 460/113 |
| 4,900,290 | A | * | 2/1990 | Tanis ............... A01F 12/10 209/263 |
| 5,145,461 | A | * | 9/1992 | Tanis ............... A01F 12/10 460/119 |
| 5,556,337 | A | * | 9/1996 | Tophinke ............... A01F 7/06 460/70 |
| 6,544,118 | B2 | * | 4/2003 | Schwersmann ......... A01F 12/10 460/80 |
| 6,659,859 | B2 | | 12/2003 | Nieschulze |
| 6,979,261 | B1 | * | 12/2005 | Day ............... A01D 41/1252 460/117 |
| 8,062,109 | B1 | * | 11/2011 | Pearson ............ A01D 41/1252 460/59 |
| 8,556,690 | B2 | | 10/2013 | Bojsen et al. |
| 8,920,226 | B2 | * | 12/2014 | Duquesne ............ A01D 75/187 460/105 |
| 9,456,550 | B2 | * | 10/2016 | Suen ............... A01F 12/39 |
| 2002/0045469 | A1 | | 4/2002 | Schwersmann |
| 2004/0009795 | A1 | | 1/2004 | Braunhardt |
| 2004/0250523 | A1 | | 12/2004 | Schulz |
| 2014/0271132 | A1 | * | 9/2014 | Le Roy ............... F01P 5/02 415/119 |

FOREIGN PATENT DOCUMENTS

| | | | | |
|---|---|---|---|---|
| CN | 105052418 | A | 11/2015 | |
| SU | 1653616 | A1 * | 6/1991 | ............ A01F 12/18 |

* cited by examiner

SEPARATOR MODULE FOR AN AGRICULTURAL MACHINE

FIELD

The present disclosure relates to an agricultural machine such as a harvester.

SUMMARY

In some embodiments, the disclosure provides a separator module for an agricultural machine. The separator module includes a feederhouse configured to receive crop from a harvesting platform, a casing for processing crop from the feederhouse, a first rotor positioned within the casing and rotatable relative to the casing, a second rotor positioned within the casing and rotatable relative to the casing, a cover extending between the feederhouse and the casing, The cover includes a first end and a second end. The first end has a first curvilinear section and a second curvilinear section defining a scalloped edge, and the first and second curvilinear sections are coupled to the casing. The second end defines a lateral edge that is coupled to the feederhouse. A noise control treatment is coupled to a portion of one of an interior surface or an exterior surface of the cover. A feed accelerator is positioned between the feederhouse and the casing, the cover at least partially enclosing the feed accelerator.

In some embodiments, the disclosure provides a separator module for an agricultural machine. The separator module includes a feederhouse configured to receive crop from a harvesting platform, a casing enclosing a rotor positioned therein and rotatable relative to the casing for processing crop from the feederhouse, a cover extending between the feederhouse and the casing, and a noise control treatment coupled to the cover.

In some embodiments, the disclosure provides a processing sub-assembly for use in an agricultural machine. The processing sub-assembly includes a feederhouse configured to receive crop from a harvesting platform, a feed accelerator positioned adjacent the feederhouse, a cover coupled to the feederhouse and positioned over the feed accelerator, and a noise control treatment coupled to the cover.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
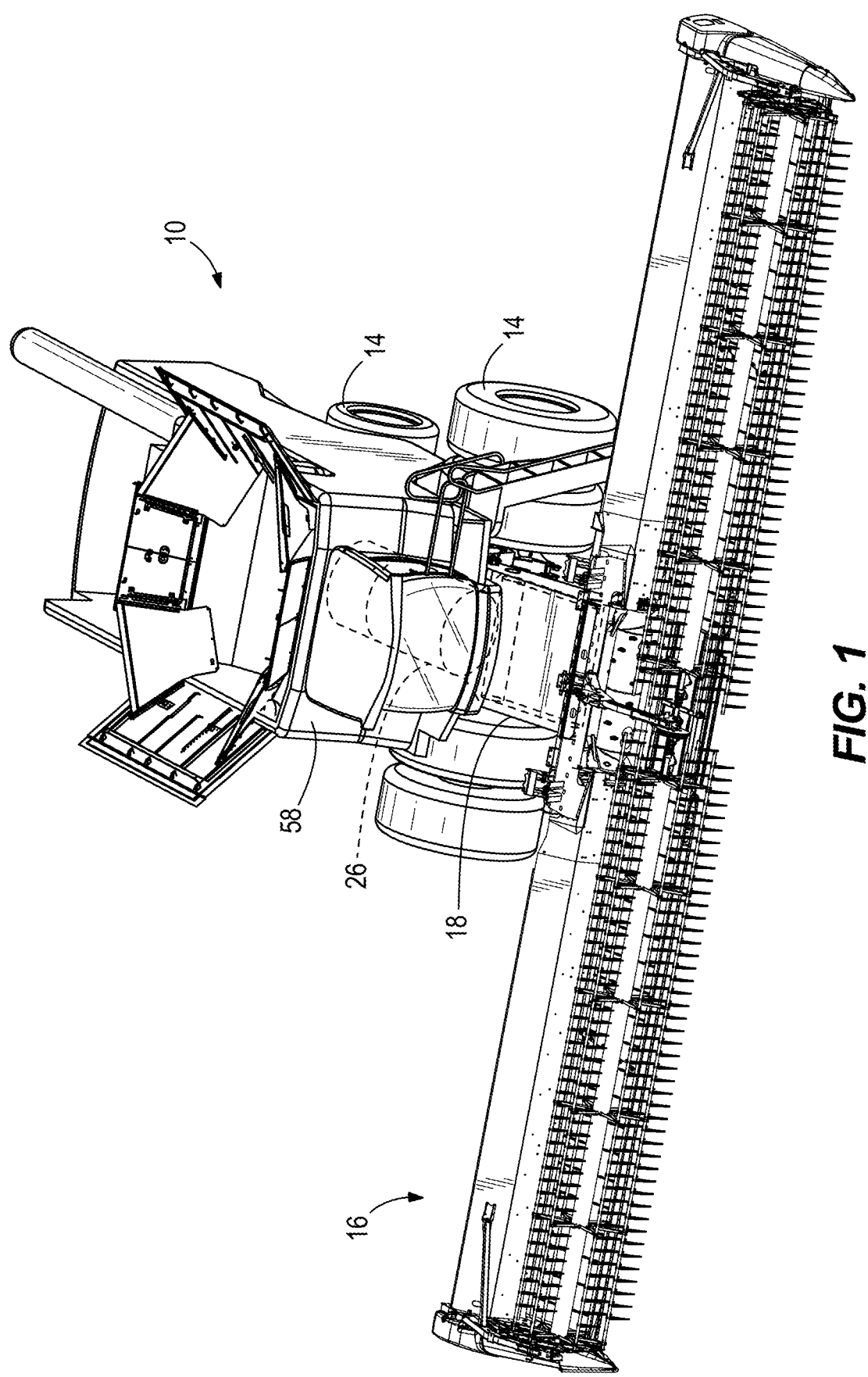
FIG. 1 is perspective view of a combine having a rotary processing unit.
Figure 2:
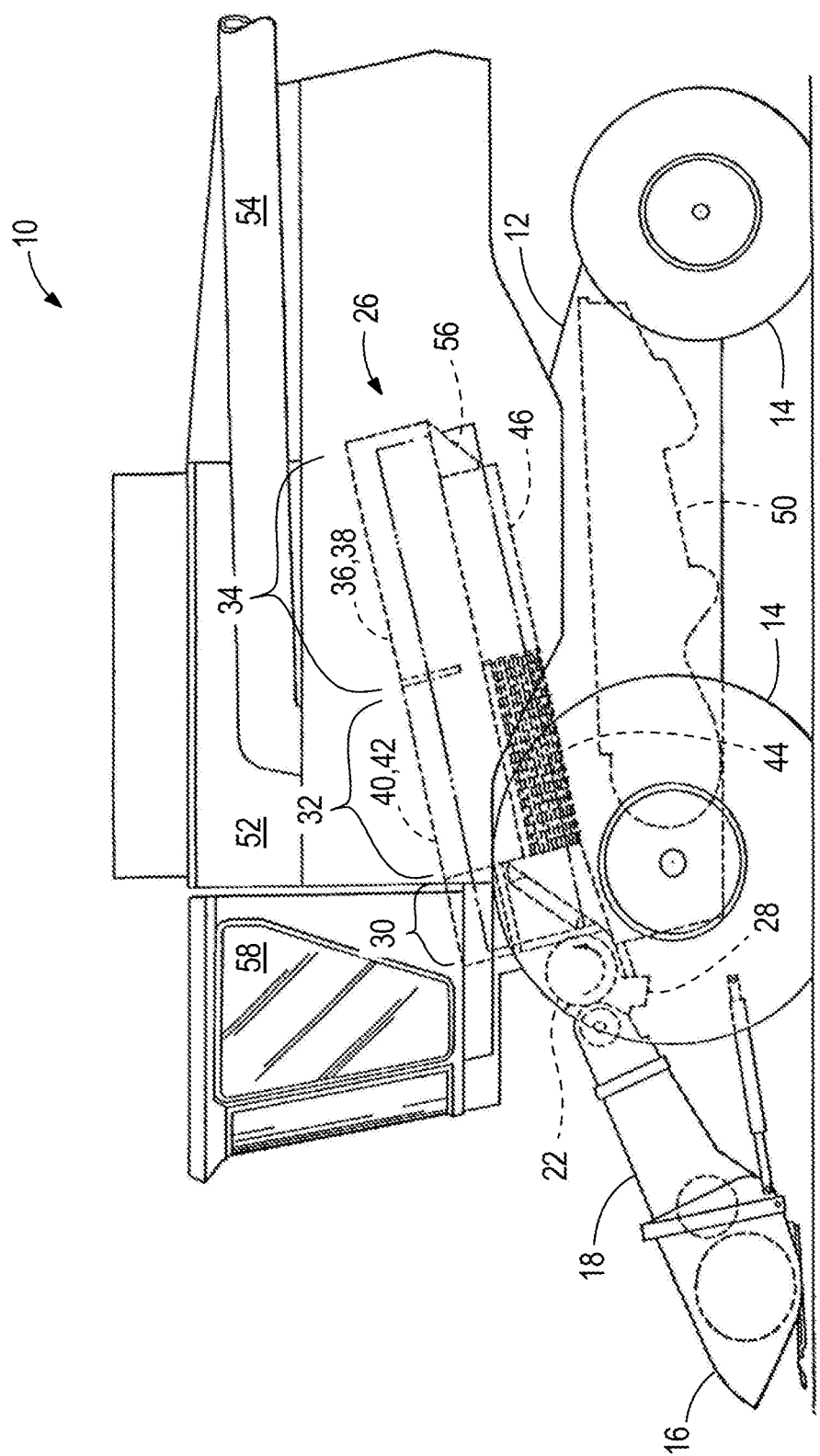
FIG. 2 is a schematic side view of the combine of FIG. 1.

FIGS. 1 and 2 show an agricultural machine embodied as a combine 10 comprising a supporting structure 12 having ground engaging members 14 extending therefrom. A harvesting platform 16 harvests crops and directs it to a feederhouse 18. The feederhouse 18 directs the crop to a separator module (FIG. 2). The separator module includes a feed accelerator 22 and a rotary crop processing unit 26. A rock trap 28 is positioned between the feederhouse 18 and the feed accelerator 22.

Figure 3:
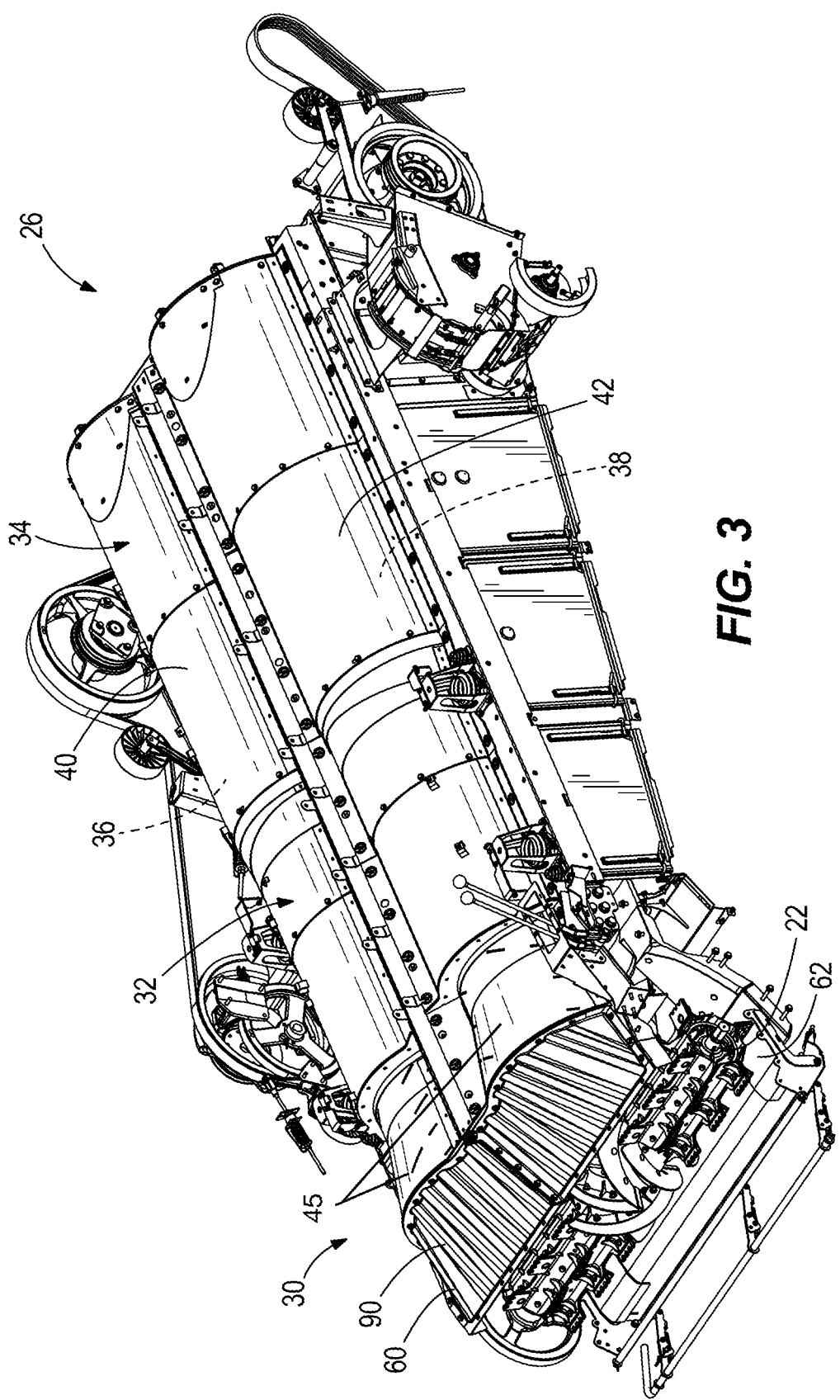
FIG. 3 is a perspective view of the rotary processing unit of FIG. 1 including an inlet cover and a noise control treatment.

With respect to FIGS. 1-3, the processing unit 26 threshes and separates the harvested crop material. In the illustrated embodiment, the processing unit 26 comprises an inlet section 30, a threshing section 32 and a separating section 34. Moreover, the illustrated processing unit 26 includes a first rotor 36 and a second rotor 38 that are radially surrounded by respective first and second casings 40, 42. As shown, the casings 40, 42 extend along the length of the processing unit 26. Accordingly, in the illustrated embodiment, the casing 40, 42 includes a transition section 45 that makes up a portion of the inlet section 30. The respective rotors 36, 38 extend between the inlet section 30 and the separating section 34. The rotors 36, 38 each comprise a hollow cylindrical drum having a plurality of crop processing elements (not shown) that engage the crop and rotate it in the respective casing 40, 42. The bottom of each of the casings 40, 42 has a concave 44 under the threshing section 32 and a separating grate 46 under the separating section 34. Though illustrated with first and second rotors 36, 38, in other or additional embodiments, the processing unit 26 may include only a single rotor and a single casing, and therefore a single concave 44 and a single separating grate 46.

Grain and chaff falling through the concave 44 and the separating grate 46 are directed to cleaning system 50. The cleaning system 50 removes the chaff and directs the clean grain to a clean grain elevator (not shown). The clean grain elevator deposits the clean grain in a grain tank 52. The clean grain in the tank 52 can be unloaded into a grain cart or truck by an unloading auger 54.

Threshed and separated straw is discharged from the rotary crop processing unit 26 through outlet 56 to a discharge beater (not shown). The discharge beater in turn propels the straw out the rear of the combine. The operation of the combine is controlled from operator cab 58.

Figure 4:
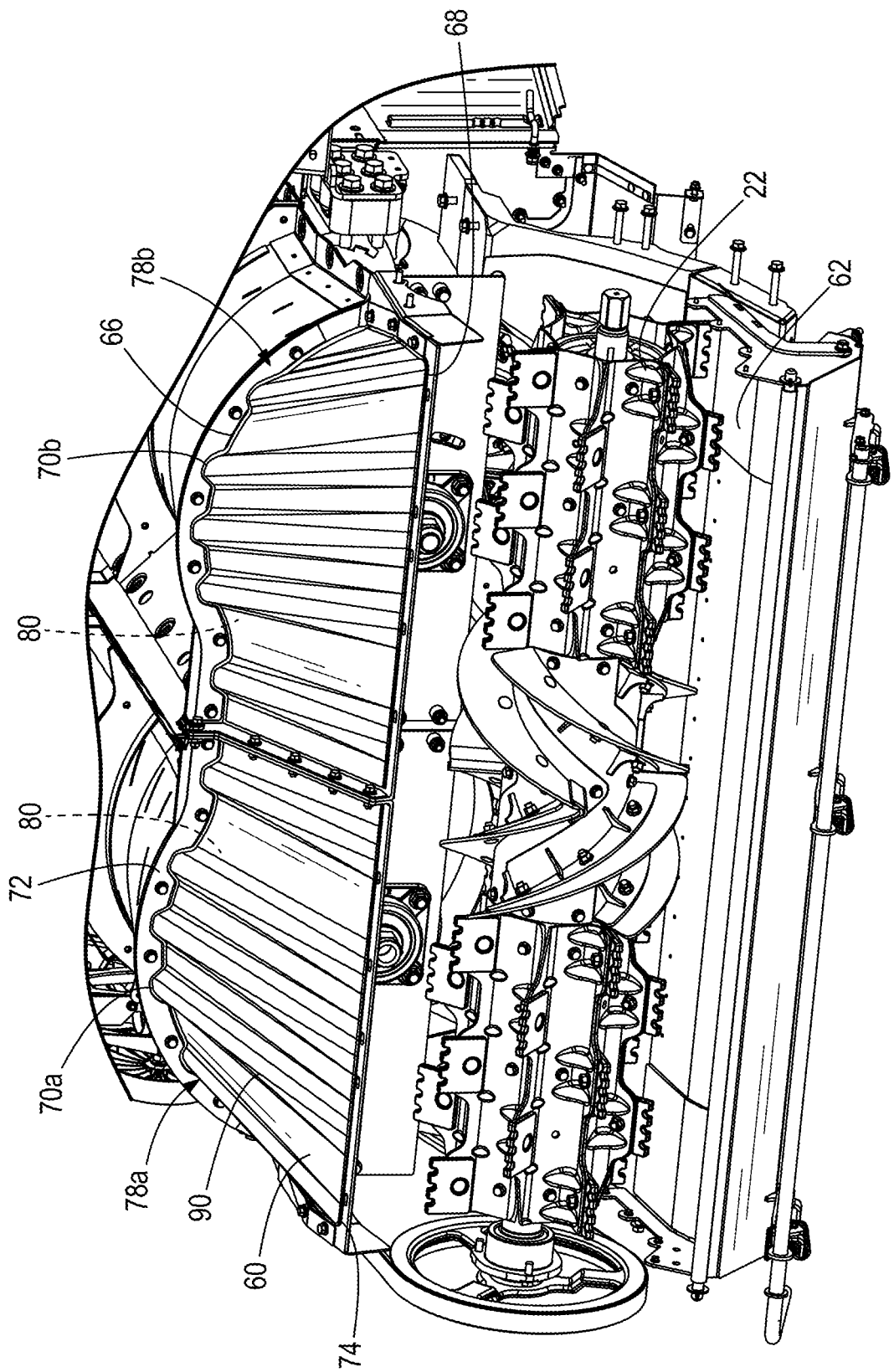
FIG. 4 is a detailed perspective view of a portion of the rotary processing unit of FIG. 3 including the inlet cover and the noise control treatment.
Figure 6:
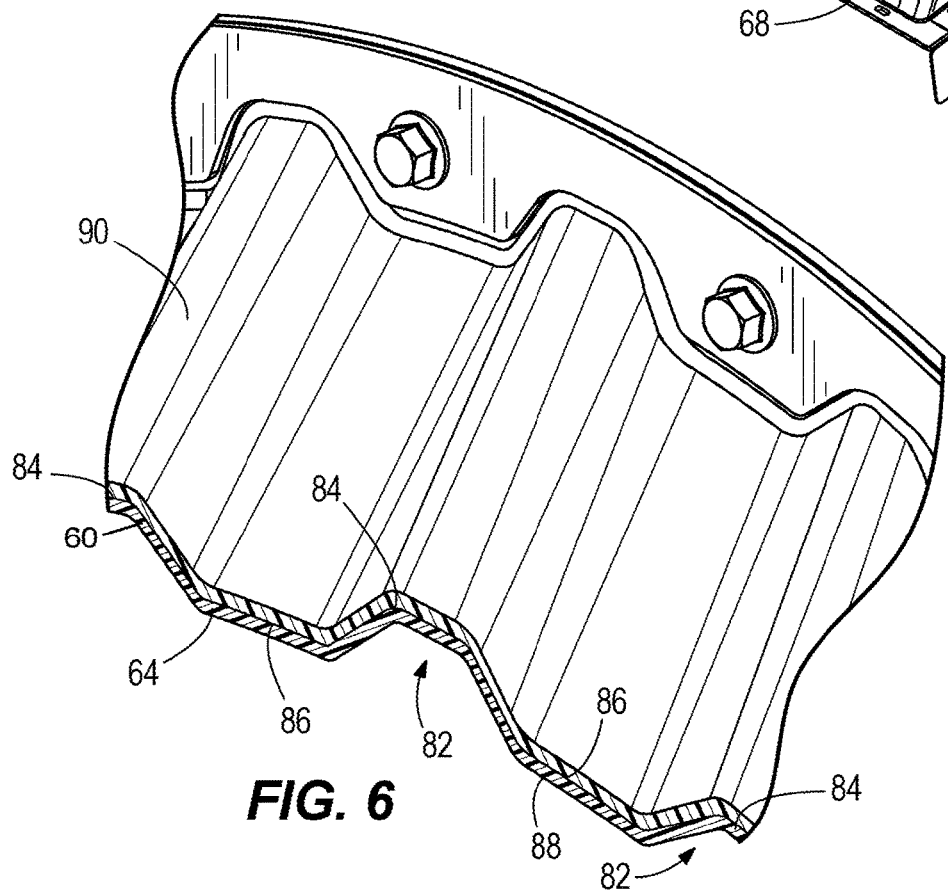
FIG. 6 is a detailed perspective view of the inlet cover and the noise control treatment of FIG. 3.
Figure 7:
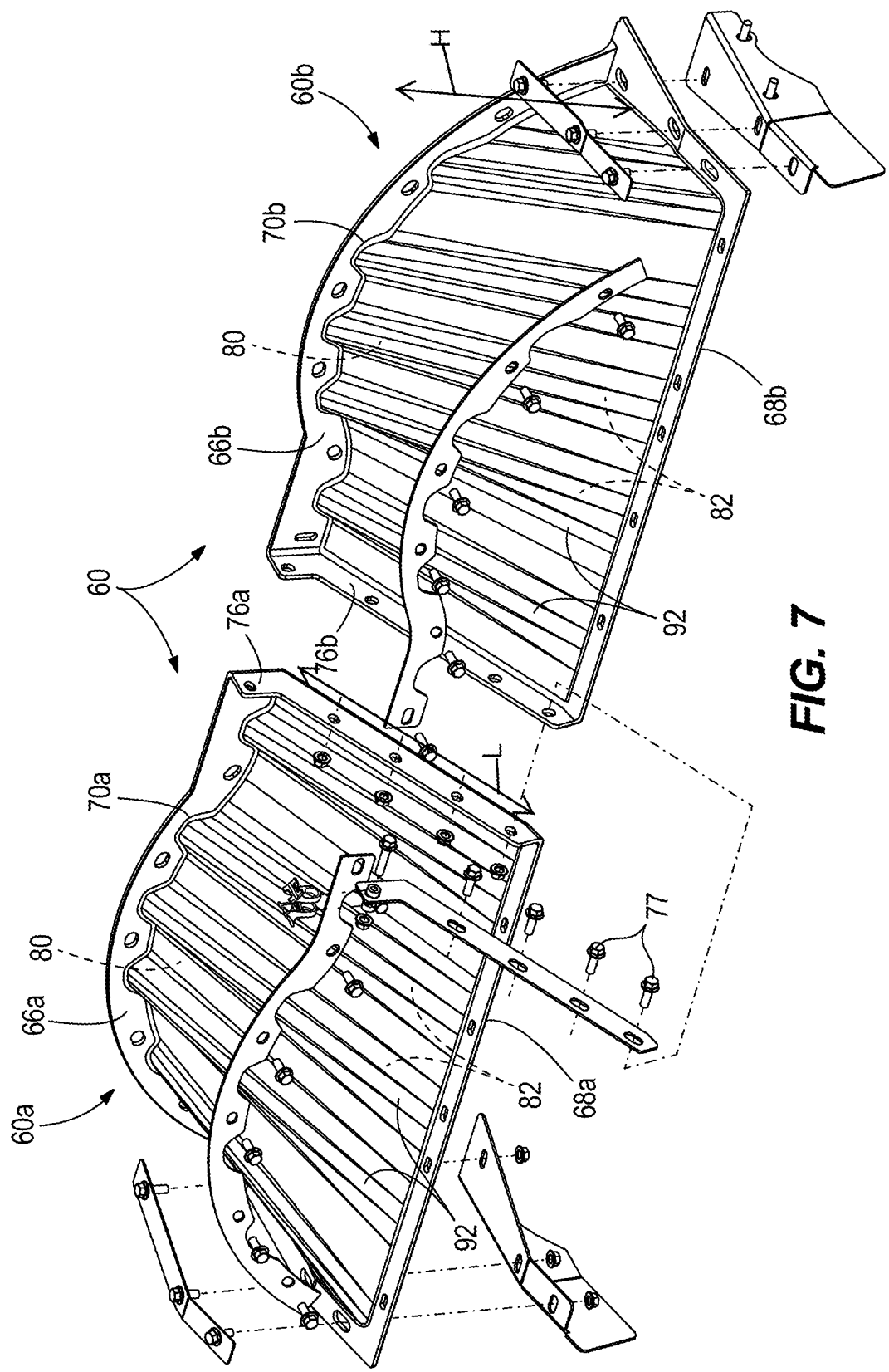
FIG. 7 is an exploded view of the inlet cover and noise control treatment of FIG. 3.
Figure 8:
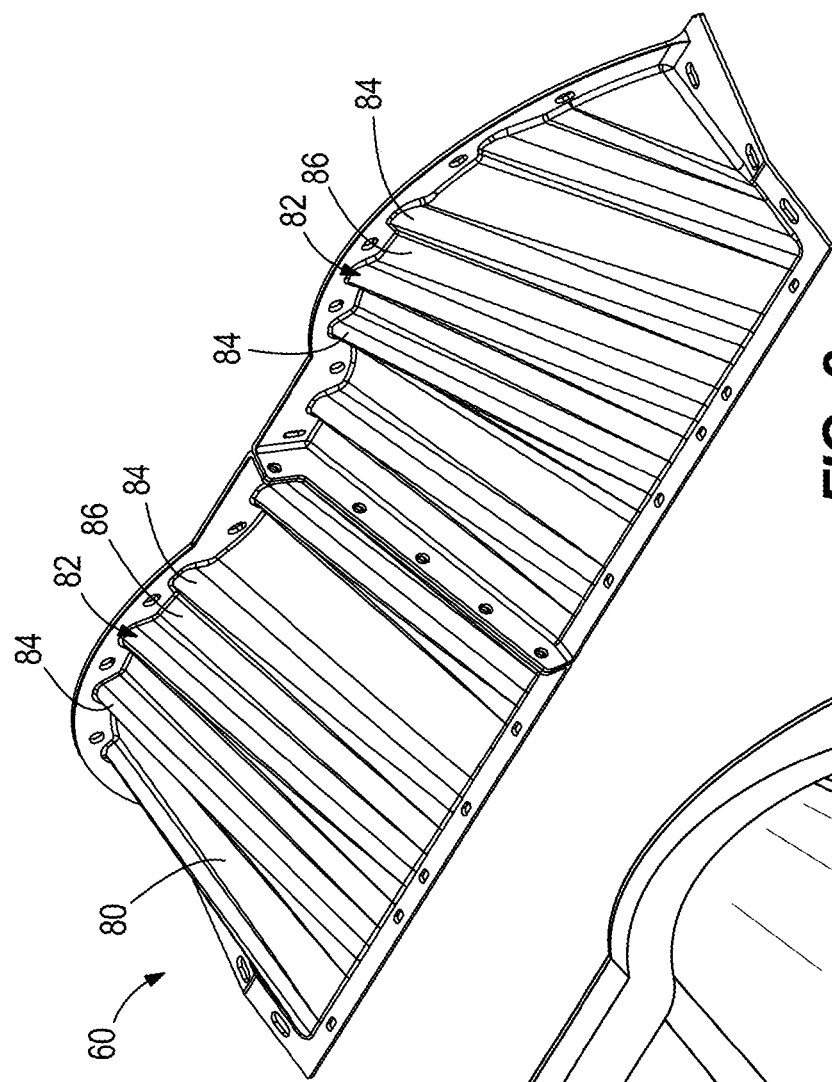
FIG. 8 is a perspective view of the inlet cover of FIG. 3.

As shown in FIGS. 3-4, an inlet cover 60 is removably coupled (e.g., by fasteners and the like) to the processing unit 26. In particular, the inlet cover 60 is removably coupled to the casing 40, 42 and makes up a portion of the inlet section 30 of the processing unit 26. That is, the inlet cover 60 is positioned between the feederhouse 18 and the processing unit 26. In particular, the inlet cover 60 is spaced apart from a floor 62 of the inlet section 30 with the feed accelerator 22 positioned therebetween. The inlet cover 60 is positioned to cover the feed accelerator 22 and rock trap 28, and removable to access the feed accelerator 22 and rock trap 28. Moreover, the inlet cover 60 includes body 64 (FIG. 6) having a first end 66 that is coupled to the casing 40, 42 of the processing unit 26 and a second end 68 that is opposite the first end 66. The first end 66 is spaced apart (e.g., above)

from the second end 68 by a height, and a length is defined between the first end 66 and the second end 68.

With respect to FIGS. 3-8, the inlet cover 60 includes a first section 78a and a second section 78b that correspond respectively to the first and second rotors 36, 38 and casings 40, 42. The first and second sections 78a, 78b are coupled to one another by mating lips or flanges 76 and fasteners 77. Accordingly, the first end 66 has a first arcuate (e.g., curvilinear) section 70a and a second arcuate (e.g., curvilinear) section 70b that together create a scalloped or undulating edge. Moreover, the first end 68 has a substantially lateral edge. Also, the first end 66 includes a first lip 72 that extends therefrom and secures the inlet cover 60 to the casing 40, 42, and the second end 68 includes a second lip 74 that extends therefrom and secures the second lip 74 to the feederhouse 18. The first lip 72 defines a first plane and the second lip 73 defines a second plane that is perpendicular to the first plane. In additional or alternative embodiments, the inlet cover 60 may only include a single arcuate section corresponding to a processing unit 26 having a single rotor and a single casing.

Further with respect to FIGS. 3-8, the body of the inlet cover 60 (whether for a single rotor machine or a double rotor machine) includes a profile having an uneven or undulating exterior surface 80. That is, in the illustrated embodiment, the exterior surface 80 has a plurality of ribs 82 that define a plurality of projections 84 and recesses 86. The ribs 82 extend in the direction of crop flow, which positively impacts crop flow and may reduce noise from the processing unit. The profile reduces noise radiation efficiency due to the undulating surface 80 of the cover 60. The ribs 82 create curvatures and depth that help to damp noise.

Figure 5:
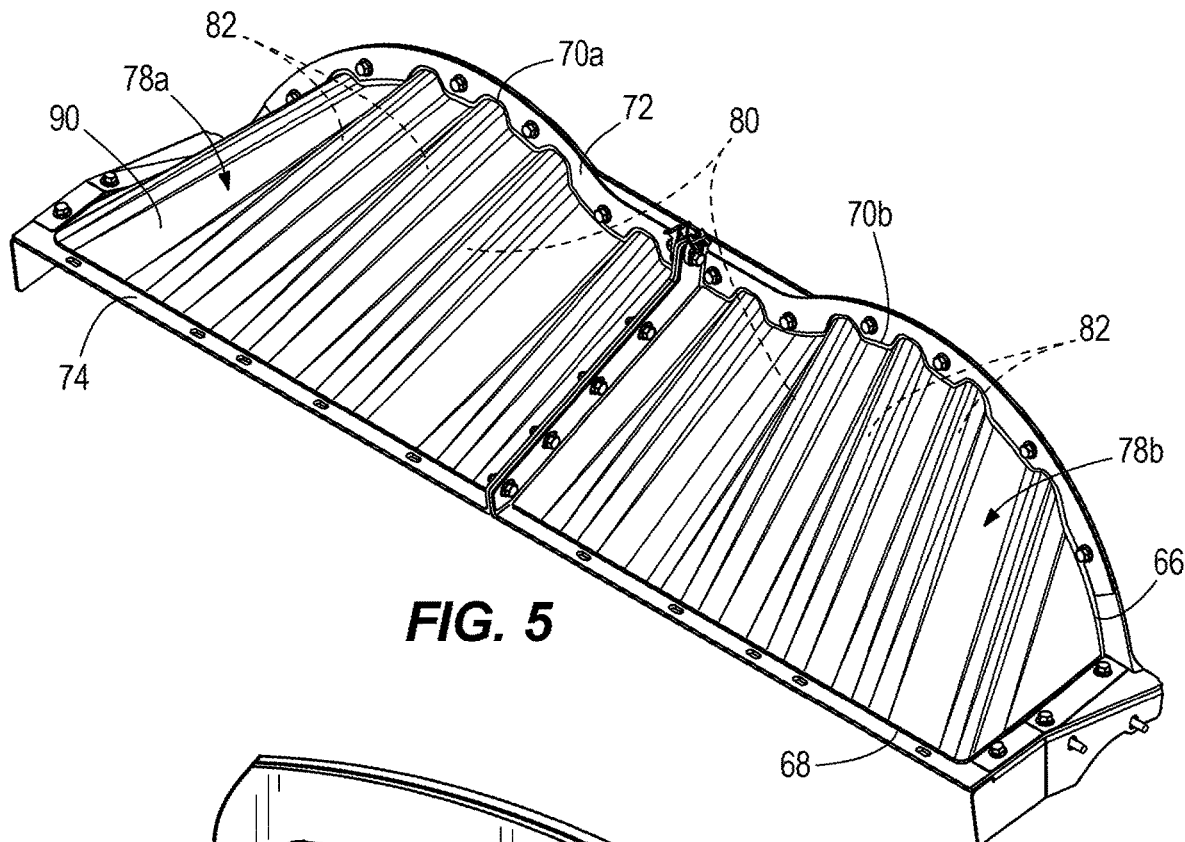
FIG. 5 is a perspective view of the inlet cover and the noise control treatment of FIG. 3.

As shown in FIG. 5, each of the projections 84 is formed as part of the exterior surface 80 of the inlet cover 60 and each of the recesses 86 is positioned between the adjacent projections 84. In the illustrated embodiment, each rib 82 has a polygonal cross-section and therefore each of the ribs 82 define substantially polygonal channels on an interior surface 88 of the inlet cover 60. In additional or alternative embodiments, the ribs may have different configurations. For example, the ribs 82 may have circular or cuboidal cross-sections. In the illustrated embodiment, the ribs 82 are not uniform. For example, the sizes and shapes of each rib 82 varies along its length. That is, each of the ribs 82 is narrower and deeper at the first end 66 of the inlet cover 60 and is wider and shallower at the second end 68 of the inlet cover 60. Accordingly, there is a first distance between adjacent ribs 82 at the first end 66 of the inlet cover and second, smaller distance between adjacent ribs 82 at the second end 68 of the inlet cover 60. In other or alternative embodiments, the ribs may be uniform. That is, in other or alternative embodiments, each rib may have the same size along its length and/or the same shape along its length and/or the ribs may have uniform distances between the ribs.

In other or additional embodiments, other elements of the separator module may also include a profile comprising an uneven or undulating surface. That is, other elements of the separator module may include a plurality of ribs extending in the direction of crop flow. For example, all or part (i.e., select sections) of the casings 40, 42 (or single casing of a single rotor machine) may include a profile or exterior surface comprising an uneven or undulating contour created by a plurality of ribs, in the manner described herein.

Figure 9:
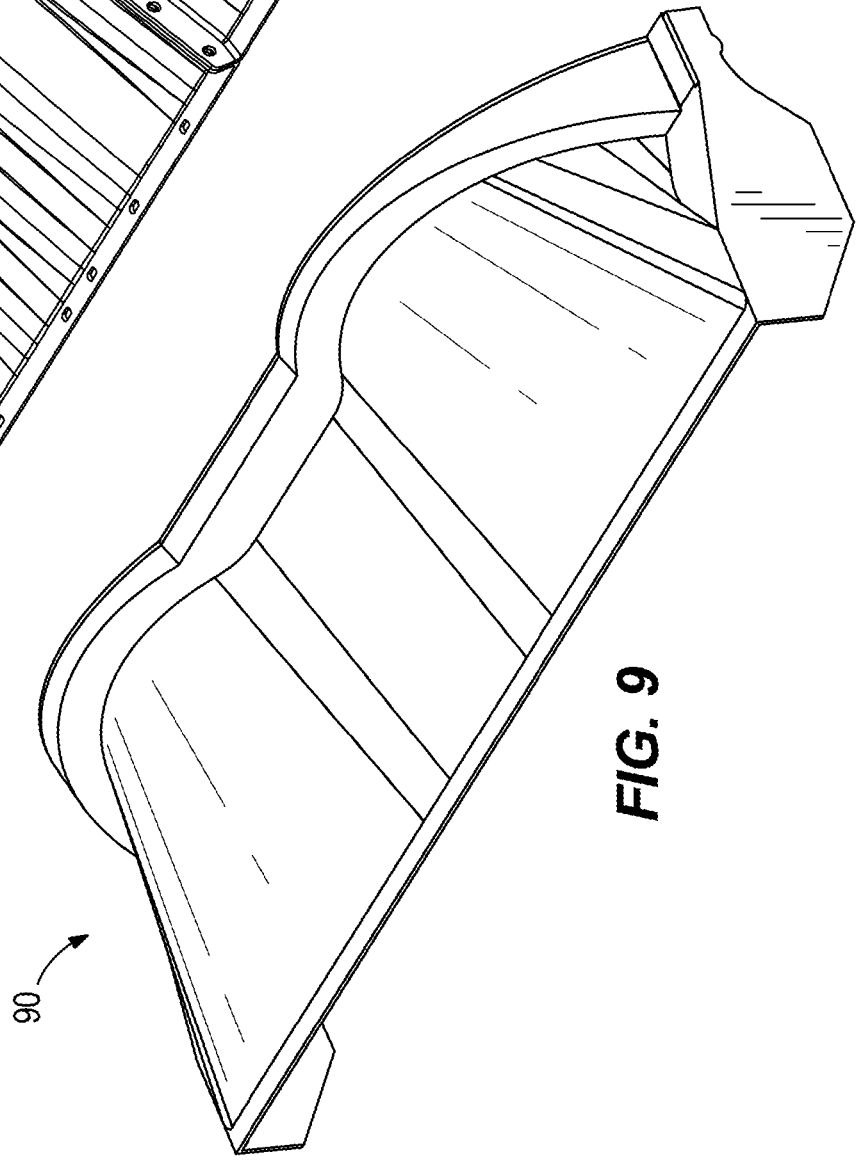
FIG. 9 is a perspective view of one embodiment of the noise control treatment of FIG. 3.
Figure 10:
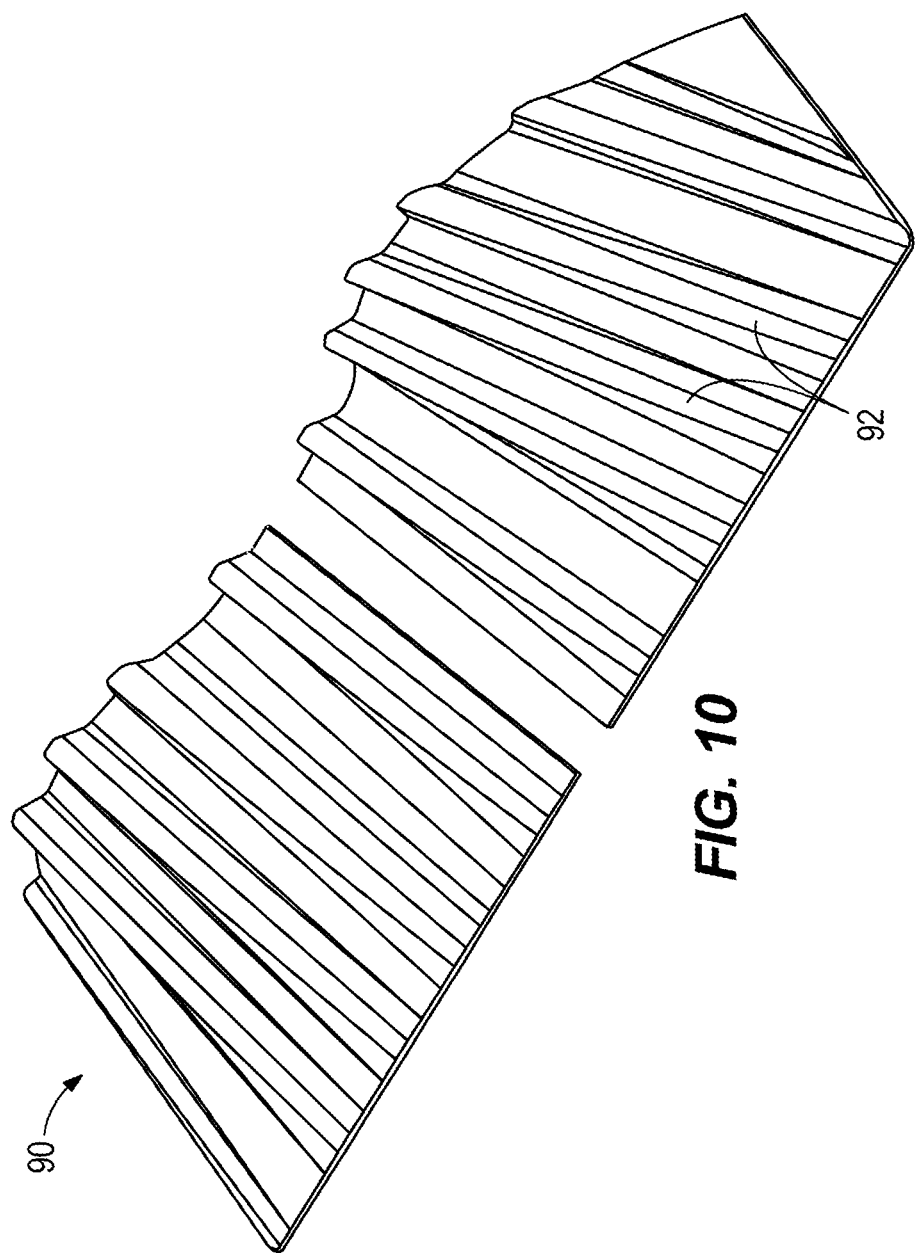
FIG. 10 is a perspective view of another embodiment of the noise control treatment of FIG. 3.

As shown in FIGS. 3-7, a noise control treatment 90 is coupled (e.g., by adhesives, fasteners, or any suitable fastening mechanism) to the inlet cover 60. In the illustrated embodiment, the noise control treatment 90 is coupled to the exterior surface 80 of the inlet cover 60, but in other or additional embodiments, the noise control treatment 90 may be coupled to an interior surface of the inlet cover 60 or both the exterior and interior surfaces of the inlet cover 60. The noise control treatment 90 may be formed by one of a noise barrier material, a noise damping material, or a composite material (e.g., a material that is both a noise barrier material and damping material). For the purposes of this application, a noise barrier material prevents noise from passing therethrough (e.g., reflects noise), while a noise damping material reduces the amplitude of noise that passes therethrough. Foam (e.g., polyurethane foam) or mass-loaded vinyl are examples of materials applicable for the noise control treatment 90, but other suitable materials may be utilized. Also, the noise control treatment 90 conforms to the ribbed surface 80 of the inlet cover 60. Accordingly, the noise control treatment 90 may either be formed of a malleable material that conforms to the ribs 82 of the inlet cover 60 (FIG. 9) or may be formed with complementary ribs 92 (FIG. 10). Together, the ribbed surface 80 and the noise control treatment 90 coupled to the inlet cover 60 help to reduce noise created by the harvester 10.

In the embodiments shown herein the cover 60 includes the noise control treatment 90. In other or additional embodiments, other elements of the separator module may also include a noise control treatment. For example, all or part of the casing 40, 42 may include a noise control treatment. For example, all or part (i.e., select sections) of the casings 40, 42 (or single casing of a single rotor machine) may include a noise control treatment, in the manner described herein.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed is:

1. A separator module for an agricultural machine, the separator module comprising:
 a feederhouse configured to receive crop from a harvesting platform;
 a casing for processing crop from the feederhouse;
 a first rotor positioned within the casing and rotatable relative to the casing to process the crop;

a second rotor positioned within the casing and rotatable relative to the casing to process the crop;

a cover extending between the feederhouse and the casing, the cover including a first end having a first curvilinear section and a second curvilinear section defining a scalloped edge, the first and second curvilinear sections being coupled to the casing, a second end defining a lateral edge that is coupled to the feederhouse, and a noise control treatment coupled to a portion of one of an interior surface or an exterior surface of the cover; and a feed accelerator positioned between the feederhouse and the casing, the cover at least partially enclosing the feed accelerator.

2. The separator module of claim 1, wherein the noise control treatment is formed from a noise barrier material or a noise damping material.

3. A separator module for an agricultural machine, the separator module comprising:

a feederhouse configured to receive crop from a harvesting platform;

a casing enclosing a rotor positioned therein and rotatable relative to the casing for processing crop from the feederhouse;

a cover extending between the feederhouse and the casing; and a noise control treatment coupled to the cover.

4. The separator module of claim 3, wherein the noise control treatment is formed from a noise barrier material or a noise damping material.

5. The separator module of claim 3, wherein the noise control treatment is foam or mass-loaded vinyl.

6. The separator module of claim 3, wherein the cover includes a body having an undulating surface.

7. The separator module of claim 6, wherein the noise control treatment overlies and conforms to the undulating surface.

8. The separator module of claim 6, wherein the undulating surface includes a plurality of ribs defining a plurality of projections and a plurality of recesses, each of the projections being formed as part of an exterior surface of the body and each of the recesses being positioned between adjacent projections.

9. The separator module of claim 3, wherein the casing is a first casing and the rotor is a first rotor, and further comprising a second casing enclosing a second rotor positioned therein and rotatable relative to the second casing for processing crop from the feederhouse, the cover extending from the feederhouse to the first casing and to the second casing.

10. The separator module of claim 3, wherein the noise control treatment overlies and conforms to at least a portion of the cover.

11. A processing sub-assembly for use in an agricultural machine, the processing sub-assembly comprising:

a feederhouse configured to receive crop from a harvesting platform;

a feed accelerator positioned adjacent the feederhouse;

a cover coupled to the feederhouse and at least partially positioned over the feed accelerator; and a noise control treatment coupled to the cover.

12. The processing sub-assembly of claim 11, wherein the noise control treatment is formed from a noise barrier material or a noise damping material.

13. The processing sub-assembly of claim 11, wherein the cover includes a body having a plurality of ribs being formed as part of an exterior surface thereof.

14. The processing sub-assembly of claim 13, wherein the noise control treatment conforms to the plurality of ribs on the exterior surface of the body.

15. The processing sub-assembly of claim 11, wherein the noise control treatment is coupled to an exterior surface of the cover.

16. The processing sub-assembly of claim 11, further comprising a processing unit including an inlet section, a threshing section, and a separating section, wherein the cover makes up a portion of the inlet section.

17. The processing sub-assembly of claim 11, further comprising a processing unit including a threshing section and a separating section, wherein the cover extends between the feederhouse and the processing unit.

18. The processing sub-assembly of claim 11, wherein the cover includes a body having an exterior surface formed of a plurality of undulations.

19. The processing sub-assembly of claim 18, wherein the noise control treatment overlies the exterior surface and conforms to the plurality of undulations.

20. The processing sub-assembly of claim 11, wherein the noise control treatment overlies and conforms to at least a portion of the cover.

* * * * *